(12) United States Patent
Woo et al.

(10) Patent No.: US 11,608,053 B2
(45) Date of Patent: Mar. 21, 2023

(54) APPARATUS FOR CONTROLLING AUTONOMOUS PARKING AND METHOD THEREOF

(71) Applicant: HL KLEMOVE CORP., Incheon (KR)

(72) Inventors: Hyeong Min Woo, Gyeonggi-do (KR); Jae Suk Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 17/129,904

(22) Filed: Dec. 21, 2020

(65) Prior Publication Data
US 2021/0213939 A1 Jul. 15, 2021

(30) Foreign Application Priority Data
Jan. 10, 2020 (KR) .......... 10-2020-0003540

(51) Int. Cl.
*B60W 30/06* (2006.01)
*G08G 1/14* (2006.01)
(Continued)

(52) U.S. Cl.
CPC ........... *B60W 30/06* (2013.01); *G05D 1/0016* (2013.01); *G06F 3/0488* (2013.01);
(Continued)

(58) Field of Classification Search
CPC .......... B60W 30/06; B60W 2050/146; B60W 2420/42; B60W 2420/52; B60W 2552/50;
(Continued)

(56) References Cited

U.S. PATENT DOCUMENTS

| 2010/0060485 A1* | 3/2010 | Kim | .................. G08G 1/148 |
| | | | 340/932.2 |
| 2014/0121883 A1* | 5/2014 | Shen | ................. B62D 15/0285 |
| | | | 701/28 |

(Continued)

FOREIGN PATENT DOCUMENTS

| CN | 108016435 A | * | 5/2018 | ............... B60R 1/00 |
| KR | 10-2014-0094116 | | 7/2014 | |

(Continued)

OTHER PUBLICATIONS

Office Action dated Mar. 29, 2021 for Korean Patent Application No. 10-2020-0003540 and its English translation by Google Translate.

*Primary Examiner* — Daryl C Pope
(74) *Attorney, Agent, or Firm* — Ladas & Parry, LLP

(57) ABSTRACT

An apparatus for controlling autonomous parking and method thereof are provided. The apparatus for controlling autonomous parking according to embodiments of the present disclosure includes a sensor to detect surrounding information of a host vehicle; a transceiver to communicate with a control server to receive space information in a parking lot; a display to display a parking situation; and a controller communicatively connected to the sensor, the transceiver, and the display and configured to detect available parking spaces based on a detection result from the sensor and space information from the control server and perform autonomous parking by setting a position selected by a user's drag operation to a target parking space among the detected available parking spaces.

22 Claims, 6 Drawing Sheets

(51) Int. Cl.
*G05D 1/00* (2006.01)
*G06F 3/0484* (2022.01)
*G06F 3/0488* (2022.01)
*G06K 9/00* (2022.01)
*G06F 3/0481* (2022.01)
*G06F 3/04845* (2022.01)
*G06F 3/04817* (2022.01)
*G06V 20/58* (2022.01)
*G06V 20/56* (2022.01)

(52) U.S. Cl.
CPC ...... *G06F 3/04817* (2013.01); *G06F 3/04845* (2013.01); *G06V 20/58* (2022.01); *G06V 20/586* (2022.01); *G06V 20/588* (2022.01); *G08G 1/143* (2013.01); *G05D 2201/0213* (2013.01)

(58) Field of Classification Search
CPC .. B60W 2556/45; B60W 50/14; B60W 30/10; B60W 40/02; B60W 60/001; G05D 1/0016; G05D 2201/0213; G06F 3/04817; G06F 3/04845; G06F 3/0488; G06F 3/04847; G06F 3/0486; G06F 3/04886; G06K 9/00798; G06K 9/00805; G06K 9/00812; G08G 1/143; G08G 1/168; G08G 1/0962; B60R 2300/20; B60R 2300/301; B60R 1/00; B60R 21/0134; B60R 2300/10; B60Y 2300/08; B62D 15/0285; B60K 31/0008; B60K 35/00; B60K 2031/0016; B60K 2370/119; B60K 2370/1434; B60K 2370/1438; B60K 2370/175; B60K 2370/21; B60K 2370/52
See application file for complete search history.

(56) References Cited

U.S. PATENT DOCUMENTS

| | | | |
|---|---|---|---|
| 2017/0046955 A1* | 2/2017 | Shen | G08G 1/143 |
| 2017/0355307 A1* | 12/2017 | Ha | H04N 7/183 |
| 2020/0060485 A1* | 2/2020 | Paulla | A47L 9/325 |
| 2020/0346639 A1* | 11/2020 | Tashiro | G01C 21/34 |

FOREIGN PATENT DOCUMENTS

| | | |
|---|---|---|
| KR | 10-2017-0105455 | 9/2017 |
| KR | 10-2017-0117661 | 10/2017 |

\* cited by examiner

APPARATUS FOR CONTROLLING AUTONOMOUS PARKING AND METHOD THEREOF

CROSS-REFERENCE TO RELATED APPLICATION

This application claims priority to and the benefit of Korean Patent Application No. 10-2020-0003540, filed on Jan. 10, 2020, the disclosure of which is incorporated herein by reference in its entirety.

TECHNICAL FIELD

The present disclosure relates to an apparatus for controlling autonomous parking and method thereof.

BACKGROUND

Recently, as the demand for safety and convenience of the vehicle as well as the demand for vehicle performance increases, a driver assistance system (DAS) that assists in controlling the vehicle based on information acquired through sensors installed in the vehicle, etc. has been researched/developed and applied to vehicles.

In particular, autonomous parking technology is a trend that is widely used in vehicle applications as a convenience function with a high level of driver's perception. Conventional apparatuses for controlling autonomous parking perform autonomous parking by setting a first detected available parking space as a target parking space. Therefore, there is a limitation that it does not provide drivers with a comprehensive parking situation around a host vehicle and does not automatically perform parking to a location a driver wants.

SUMMARY

Various aspects of the present disclosure are directed to providing an apparatus for controlling autonomous parking and method thereof capable of easily operating selection of a target parking space by detecting a plurality of available parking spaces around a host vehicle.

The technical problems to be solved in the present disclosure are not limited to the technical problems mentioned above, and other technical problems not mentioned will be clearly understood by those of ordinary skill in the art from the following description.

One aspect of the present disclosure is directed to providing an apparatus for controlling autonomous parking, comprising: a sensor to detect surrounding information of a host vehicle; a transceiver to communicate with a control server to receive space information in a parking lot; a display to display a parking situation; and a controller communicatively connected to the sensor, the transceiver, and the display and configured to detect available parking spaces based on a detection result from the sensor and space information from the control server and perform autonomous parking by setting a position selected by a user's drag operation to a target parking space among the detected available parking spaces.

In an embodiment, the apparatus for controlling autonomous parking may further include a storage to store information on the detected available parking spaces, in which the controller may be configured to store available parking spaces searched based on the detection result of the sensor in the storage.

In an embodiment, the controller may be configured to set a target parking space to a position to which the host vehicle icon is moved by the drag operation on the screen displayed on the display.

In an embodiment, when a user's swipe operation is input the controller may be configured to display an area moved in the swipe direction from a current position on the display.

In an embodiment, the controller may be configured to expand or reduce and display a display area on the display when a user's pinch operation is input.

In an embodiment, the controller may be configured to receive parking lot map information from the control server and display the available parking spaces on the parking lot map.

In an embodiment, the controller may be configured to display the available parking spaces received from the control server and the available parking spaces from the detection result of the sensor separately.

In an embodiment, the controller may be configured to recognize surrounding obstacles and parking lines according to the detection result of the sensor and display them on the display.

In an embodiment, the controller may be configured to generate an optimal parking route by determining a size of and a distance to the set target parking space.

In an embodiment, the controller may be configured to perform autonomous driving so that the host vehicle moves to a corresponding position if the set target parking space is based on the space information received from the control server.

In an embodiment, the display may be a touch screen panel.

In an embodiment, the sensor may include at least one of an image sensor, a lidar sensor, a radar sensor or an ultrasonic sensor and the transceiver may include a short-range wireless communication module or a long-range wireless communication module.

In an embodiment, the sensor may include a front camera or an around view camera and the controller may be configured to display the surrounding information in an around view.

Another aspect of the present disclosure is directed to providing a method for controlling autonomous parking, comprising: detecting available parking spaces based on detected surrounding information of a host vehicle and space information received from a control server; displaying the detected available parking spaces on a screen; receiving an input of drag operation by a user among the detected available parking spaces displayed on the display; and performing autonomous parking by setting a position selected by the drag operation to a target parking space.

In an embodiment, the detecting may include storing the available parking spaces searched based on the detected surrounding information of the host vehicle.

In an embodiment, the performing may include setting a target parking space to a position to which the host vehicle icon is moved by the drag operation on the displayed screen.

In an embodiment, the displaying may include, when a user's swipe operation is input, displaying an area moved in the swipe direction from a current position on the display.

In an embodiment, the displaying may include expanding or reducing and displaying a display area on the screen when a user's pinch operation is input.

In an embodiment, the displaying may include receiving parking lot map information from the control server and displaying the available parking spaces on the parking lot map.

In an embodiment, the displaying may include displaying the available parking spaces received from the control server and the available parking spaces from the detected surrounding information separately.

In an embodiment, the displaying may include recognizing detected surrounding obstacles and parking lines and displaying them on the screen.

In an embodiment, the displaying may include displaying the surrounding information in an around view on the screen.

In an embodiment, the performing may include generating an optimal parking route by determining a size of and a distance to the set target parking space.

In an embodiment, the performing may include performing autonomous driving so that the host vehicle moves to a corresponding position if the set target parking space is based on the space information received from the control server.

An apparatus for controlling autonomous parking and method thereof according to an embodiment of the present disclosure may improve a user's operability and convenience by providing the user with options so that the user can easily select a target parking space from a plurality of available parking spaces detected around the host vehicle.

In addition, an apparatus for controlling autonomous parking and method thereof according to an embodiment of the present disclosure may improve the user's sense of stability and satisfaction for parking by performing autonomous parking according to a selection of the user.

In addition, an apparatus for controlling autonomous parking and method thereof according to an embodiment of the present disclosure may further improve the user's operability and convenience by allowing the user to intuitively select with a minimum operation by setting a target parking space by a drag operation from detected available parking spaces.

In addition, an apparatus for controlling autonomous parking and method thereof according to an embodiment of the present disclosure may easily provide more information on available parking spaces by changing or expanding a display area by a swipe operation.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Figure 1:
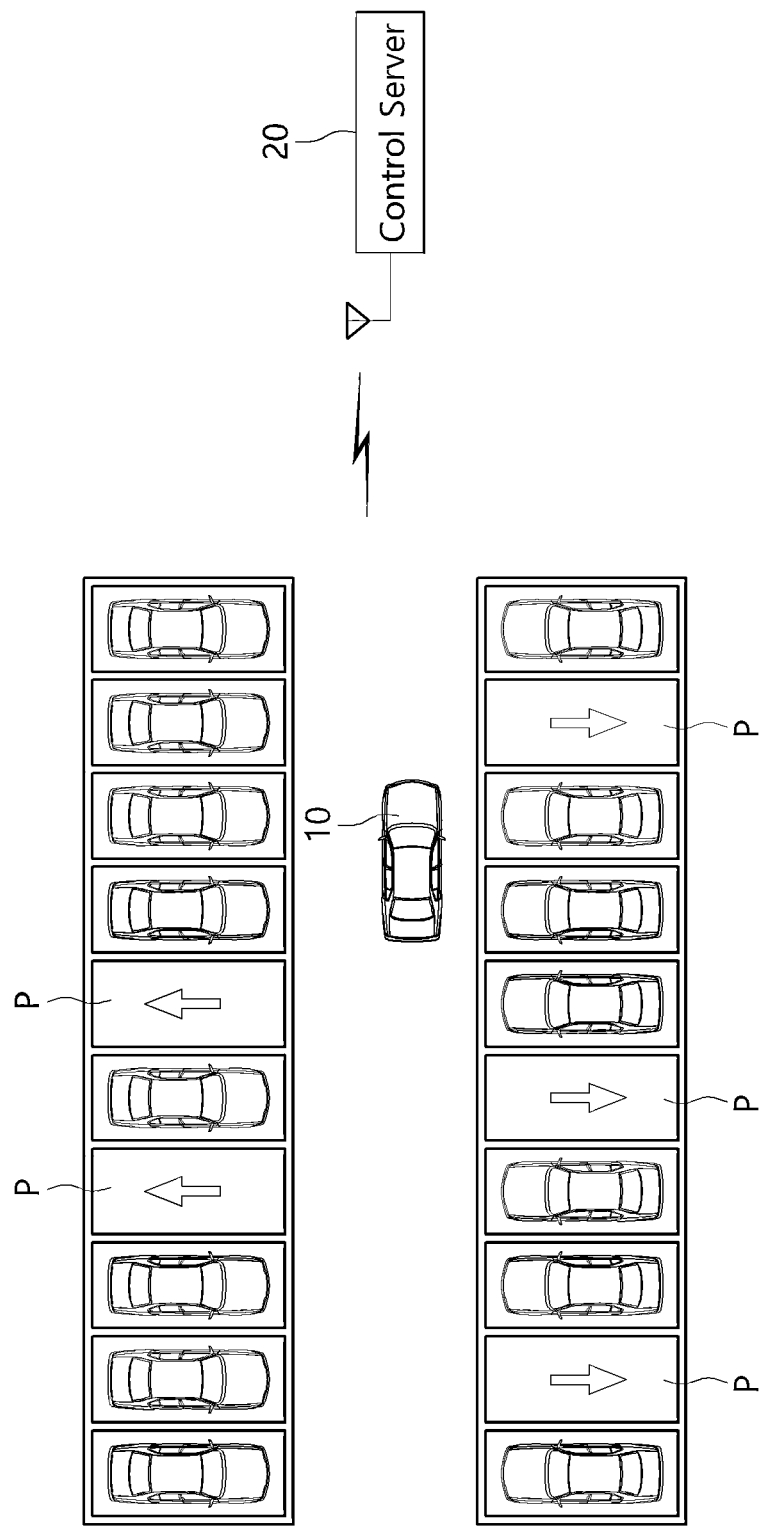
FIG. 1 is an exemplary view showing a process of detecting available parking spaces by a vehicle equipped with an apparatus for controlling autonomous parking according to an exemplary embodiment of the present disclosure.

Hereinafter, exemplary embodiments of the present disclosure will be described in detail so that those of ordinary skill in the art can readily implement the present disclosure. The present disclosure may be embodied in many different forms and are not limited to the embodiments set forth herein. In the drawings, parts unrelated to the description are omitted for clarity. Throughout the specification, like reference numerals denote like elements.

Embodiments of the present disclosure are provided to describe the present disclosure more fully to those skilled in the art, the embodiments described below can be modified into various other forms, and the scope of the present disclosure is not limited to the following embodiments. Rather, these embodiments make the disclosure more meaningful and complete and are provided for fully conveying the concept of the disclosure to those skilled in the art.

FIG. 1 is an exemplary view showing a process of detecting available parking spaces by a vehicle equipped with an apparatus for controlling autonomous parking according to an exemplary embodiment of the present disclosure.

Referring to FIG. 1, a host vehicle 10 equipped with an apparatus for controlling autonomous parking 100 detects available parking spaces (P) while entering a parking lot. At this time, the host vehicle 10 may detect conditions around the parking lot while proceeding to the parking lot after receiving information on the parking lot from a control server 20.

In addition, the host vehicle 10 may autonomously perform parking by avoiding any vehicle or obstacle parked in a parking area. Here, there may be a plurality of detected available parking spaces (P). In this case, the host vehicle 10 may provide a user with an option to select an available parking space (P).

Meanwhile, among the plurality of available parking spaces, there may be a space desired by the user. In this case, the host vehicle 10 equipped with the apparatus for controlling autonomous parking 100 according to an embodiment of the present disclosure may provide the user with options so that the user can easily select a desired target parking space from available parking spaces.

Accordingly, it may be possible to intuitively select a target parking space from detected plurality of available parking spaces. In addition, it may be possible to reduce the number of operations by the user by performing the selection of the target parking space with only one operation. Therefore, it may be possible to reduce the user's burden during autonomous parking, thereby improving the user's operability and convenience.

Figure 2:
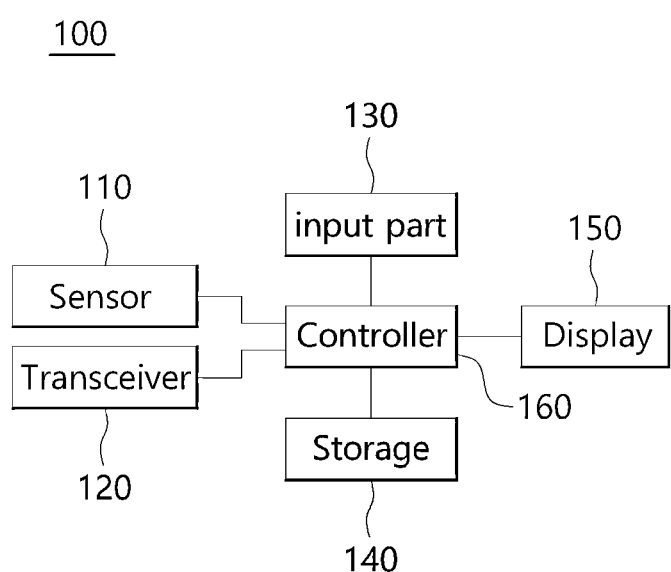
FIG. 2 is a block diagram of an apparatus for controlling autonomous parking according to an exemplary embodiment of the present disclosure.

FIG. 2 is a block diagram of an apparatus for controlling autonomous parking according to an exemplary embodiment of the present disclosure.

The apparatus for controlling autonomous parking 100 may include a sensor 110, a transceiver 120, a input part 130, a storage 140, a display 150, and a controller 160.

The sensor 110 may detect information around a host vehicle 10. In an example, the sensor 110 may include at least one of an image sensor, a radar, a lidar or an ultrasonic sensor mounted at various positions in the front and rear and sides of a vehicle. However, the sensor 110 is not limited and may include various sensors capable of detecting surrounding information.

In addition, the sensor may include a front camera or an around view camera. Here, the around view camera may be a plurality of cameras provided in the front, right and left sides, and rear of a vehicle.

The transceiver 120 may communicate with a control server 20 to receive space information in a parking lot. In an example, the transceiver 120 may include a short-range wireless communication module or a long-range wireless communication module. Here, the short-range wireless communication module may include Wi-Fi and Bluetooth methods. The long-range wireless communication module may include cellular communication methods (2G/3G/4G/5G).

The input part 130 may be input user selection. In an example, the input part 130 may be a selection switch on an audio device or on a navigation installed in a vehicle 10. In addition, the input part 130 may be a touch screen pad integrally provided with the display 150. In this case, the user may select one of the available parking spaces displayed on the touch screen pad.

The storage 140 may store parking lot map information received from the control server 20. Here, the parking lot map information may include the available parking spaces. In addition, the storage 140 may store information on available parking spaces detected by the sensor 110 while the host vehicle 10 proceeds.

The display 150 may display a parking situation under the control of the controller 160. In this case, the display 150 may display a plurality of available parking spaces to be selected by the user. Here, the display 150 may be a touch screen panel integrally formed with the input part 130.

The controller 160 may be communicatively connected to the sensor 110, the transceiver 120, the input part 130, the storage 140 and the display 150. Here, the controller 160 may be an ECU of the vehicle 10. Optionally, the controller 160 may be a controller separately equipped for autonomous parking.

In addition, the controller 160 may be configured to detect an available parking space based on space information from the control server 20. In this case, the controller 160 may be configured to receive parking lot map information through the transceiver 120 from the control server 20. Here, the controller 160 may be configured to store the received parking lot map information in the storage 140.

In addition, the controller 160 may be configured to display the available parking space on the parking lot map received from the control server 20. That is, the controller 160 may be configured to display the available parking space together with the parking lot map on the display 150.

In addition, the controller 160 may be configured to detect the available parking space based on a detection result of the sensor 110. In this case, the controller 160 may be configured to detect a surround situation of the host vehicle 10. Here, the controller 160 may be configured to store information on the previously detected available parking space in the storage 140.

In an example, the controller 160 may be configured to recognize surrounding obstacles and parking lines according to a detection result of the sensor 110. In this case, the controller 160 may be configured to display the recognized surrounding information on the display 150. Optionally, the controller 160 may be configured to display surrounding information according to the detection result of the sensor 110 in an around view.

In this case, the controller 160 may be configured to display the available parking space received from the control server 20 and the available parking space from the detection result of the sensor 110 separately. In an example, the controller 160 may be configured to display the available parking space received from the control server 20 and the available parking space from the detection result of the sensor 110 in different colors.

In this way, the controller 160 may be configured to detect an approximate available parking space from the control server 20 and detect an actual available parking space by the sensor 110.

In addition, when there is a plurality of detected available parking spaces, the controller 160 may be configured to perform autonomous parking by setting a target parking space according to a selection of a user. In an example, the controller 160 may be configured to perform autonomous parking by setting a position selected by the user's drag operation to a target parking space among the detected available parking spaces.

Here, when the user drags an icon of a vehicle 10 to a desired available parking space on a screen displayed on the display 150, the controller 160 may be configured to set the dragged position of the icon of the vehicle 10 to a target parking space.

In this case, the controller 160 may be configured to generate an optimal parking route by determining a size of and a distance to the target parking space set by the user's drag. Here, if the set target parking space is based on the parking space received from the control server 20, first, the controller 160 may be configured to perform autonomous driving so that the host vehicle 10 moves to a corresponding position. Subsequently, the controller 160 may determine the size of and the distance to the target parking space based on the detection result of the sensor 110.

Meanwhile, an available parking space or an available parking space desired by the user may not exist on the currently displayed area. For this reason, the present disclosure may display an available parking space detected around the current location of the host vehicle 10 according to the user's selection.

In an example, the controller 160 may be configured to change the display area according to a user's swipe operation. In this case, when the user's swipe operation is input through the screen displayed on the display 150, the controller 160 may be configured to display on the display 150 an area moved in the swipe direction from the current position. Here, the swipe direction may include any of up, down, left, or right direction.

In addition, the controller 160 may be configured to expand or reduce and display the display area according to the user's pinch operation. In this case, when the user's pinch operation is input through the screen of the display 150, the controller 160 may be configured to expand or reduce and display the display area according to the pinch operation. Here, the pinch operation may include an increase and decrease in distance between fingers. That is, when the distance between fingers increases, the display area may be expanded, and when the distance between fingers decreases, the display area may be reduced.

In this case, the controller 160 may be configured to display a display area that is moved, expanded, or reduced by using the available parking space information stored through previous search in the storage 140.

Accordingly, since the display area may be changed or expanded, it may be possible to easily provide more information on the available parking spaces.

Figure 3:
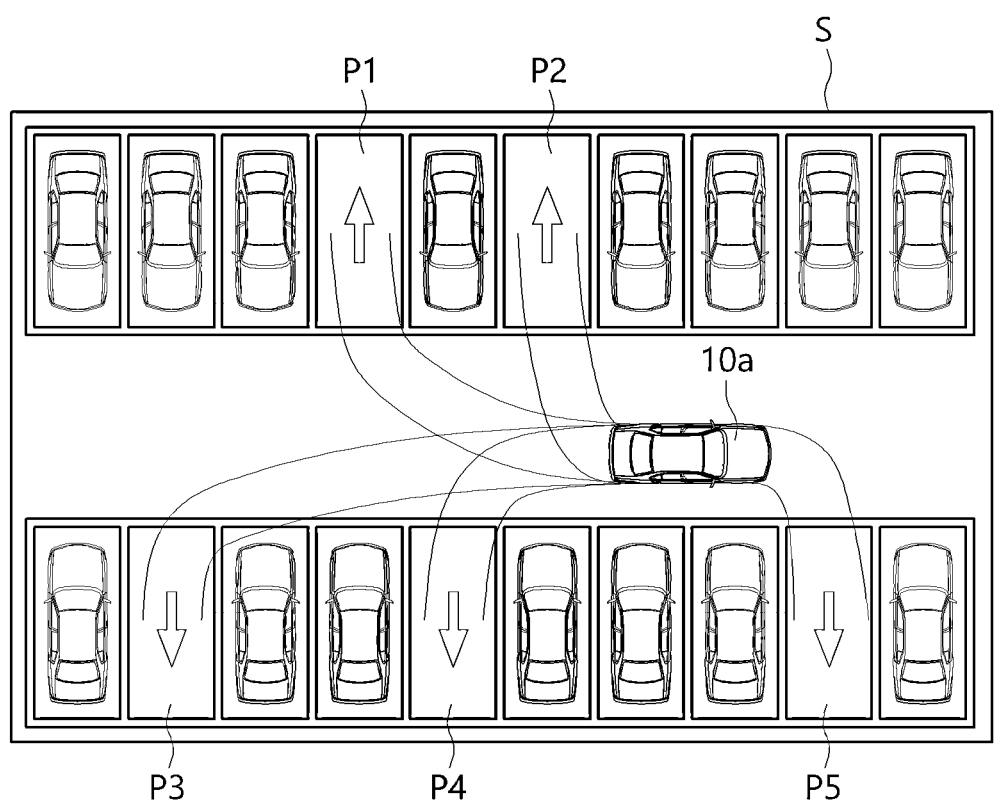
FIG. 3 is an exemplary view showing a screen displaying available parking spaces detected by the apparatus for controlling autonomous parking according to an exemplary embodiment of the present disclosure.
Figure 4:
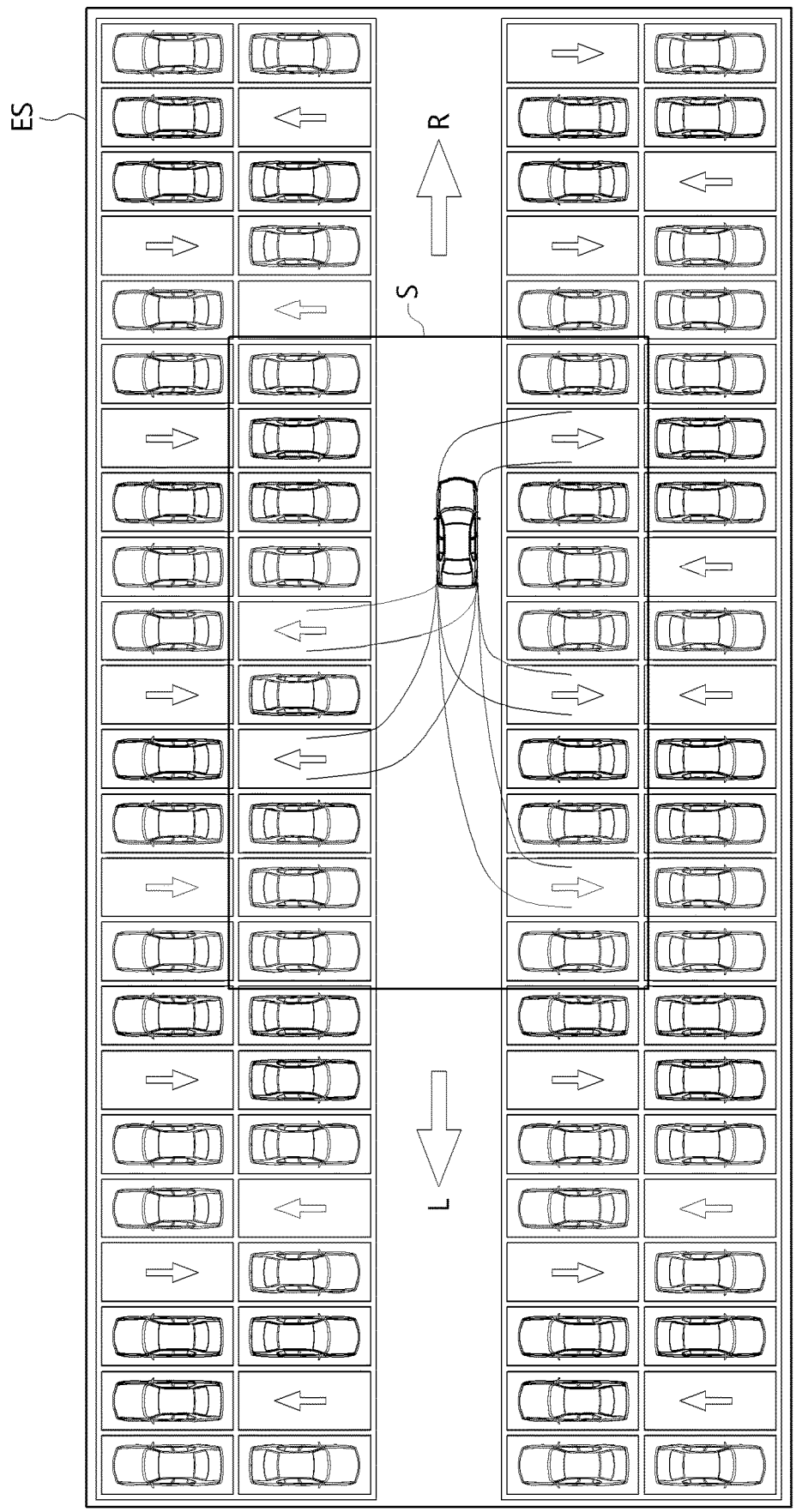
FIG. 4 is an exemplary view showing expansion and movement of a screen in the apparatus for controlling autonomous parking according to an exemplary embodiment of the present disclosure.

FIG. 3 is an exemplary view showing a screen displaying available parking spaces detected by the apparatus for controlling autonomous parking according to an exemplary embodiment of the present disclosure and FIG. 4 is an exemplary view showing expansion and movement of a screen in the apparatus for controlling autonomous parking according to an exemplary embodiment of the present disclosure.

Referring to FIG. 3, a screen S displayed on the display 150 may include a host vehicle icon 10*a* and available parking spaces P1 to P5. Here, the available parking spaces P1 to P5 may be displayed with any mark or in different colors from the surroundings.

In an example, the available parking spaces P1 to P5 may be displayed with arrows indicating an entry direction. In addition, the available parking spaces P1 to P5 may be displayed in a single color. Accordingly, since the user can easily identify a plurality of available parking spaces P1 to P5, it is possible to support the user to easily select a desired available parking space.

In this case, the user may drag the host vehicle icon 10*a* to an available parking space desired by the user among the available parking spaces P1 to P5.

Referring to FIG. 4, when there is no available parking space P1 to P5 or a desired available parking space on the current screen S, the user may change an area displayed on the display 150. In this case, the change of the screen S may be selected by a swipe operation or a pinch operation of the user.

In an example, when swiping in the left (L) or right (R) direction of the screen, the screen S displayed on the display 150 may move in a corresponding direction to display a corresponding area.

In addition, when a pinch operation for reduction is input, the screen S may be changed to an expanded screen ES in which the range of the available parking spaces are expanded. Accordingly, it is possible to expand and display not only the left (L) or the right (R) but also the upper or lower region around the host vehicle icon 10*a*. Therefore, the user's convenience may be further improved by expanding the range of the user's selection.

With such a configuration, the apparatus for controlling autonomous parking according to an embodiment of the present disclosure may improve the user's operability and convenience, improve the user's sense of stability and satisfaction for parking, further improve the user's operability and convenience by allowing the user to intuitively select with a minimum operation, and easily provide more information on the available parking spaces.

Hereinafter, a method for controlling autonomous parking of the present disclosure will be described with reference to FIGS. 5 and 6.

Figure 5:
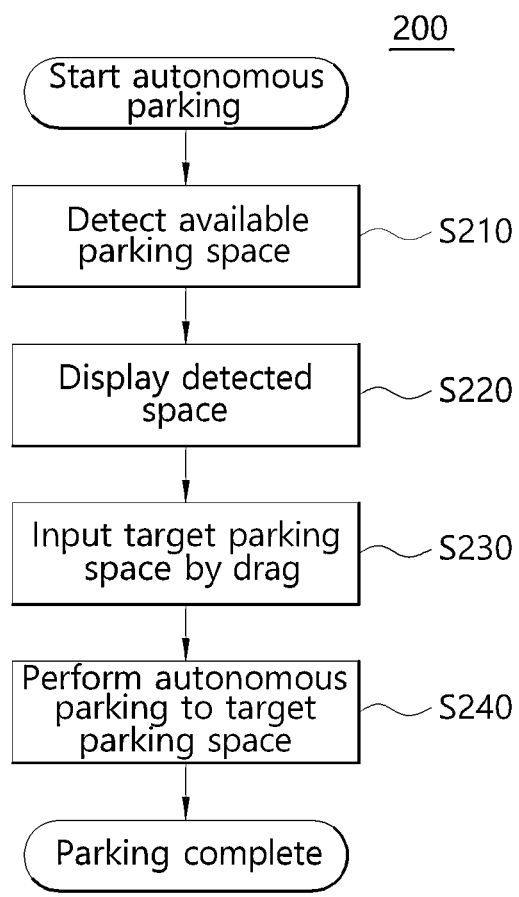
FIG. 5 is a flowchart of a method for controlling autonomous parking according to an exemplary embodiment of the present disclosure.

FIG. 5 is a flowchart of a method for controlling autonomous parking according to an exemplary embodiment of the present disclosure.

A method for controlling autonomous parking 200 includes detecting available parking spaces (S210), displaying the detected space (S220), and performing autonomous parking according to a drag position (S230 and S240).

More specifically, as shown in FIG. 5, first, the apparatus for controlling autonomous parking 100 starts autonomous parking. At this time, when a host vehicle 10 enters a parking lot, autonomous parking may be started by a user's selection.

Next, the apparatus for controlling autonomous parking 100 detects available parking spaces at step S210. In this case, the apparatus for controlling autonomous parking 100 may detect available parking spaces based on space information received from a control server 20. Here, the space information received from the control server 20 may include parking lot map information and available parking spaces.

At the same time, the apparatus for controlling autonomous parking 100 may detect surrounding information of the host vehicle and, based on this, detect available parking spaces. In this case, the apparatus for controlling autonomous parking 100 may detect surrounding situation using a sensor. Here, the apparatus for controlling autonomous parking 100 may store the available parking spaces searched based on the detected surrounding information of the host vehicle.

Next, the apparatus for controlling autonomous parking 100 displays the detected available parking spaces at step S220. In this case, the apparatus for controlling autonomous parking 100 may display the detected available parking spaces P1 to P5 on a screen S.

At the same time, the apparatus for controlling autonomous parking 100 may display the available parking spaces P1 to P5 on the screen S using the parking lot map received from a control server 20. In addition, the apparatus for controlling autonomous parking 100 may recognize detected surrounding obstacles and parking lines and display them on the screen S. Optionally, the apparatus for controlling autonomous parking 100 may display surrounding information of the host vehicle in an around view.

In this case, the apparatus for controlling autonomous parking 100 may display the available parking spaces received from the control server 20 and the available parking spaces detected by the server separately. In an example, the apparatus for controlling autonomous parking 100 may be configured to display the available parking spaces received from the control server 20 and the available parking spaces detected by the server in different colors.

Next, the apparatus for controlling autonomous parking 100 receives an input of drag operation by a user among the detected available parking spaces at step S230. In this case, the user may drag the host vehicle icon 10*a* displayed on the screen S to an available parking space desired by the user among the displayed available parking spaces P1 to P5.

Next, the apparatus for controlling autonomous parking 100 performs autonomous parking by setting a position selected by the user's drag operation to a target parking space at step S240. In this case, the apparatus for controlling autonomous parking 100 may set a target parking space to a position to which the host vehicle icon 10*a* is moved by the drag operation on the displayed screen S.

In addition, the apparatus for controlling autonomous parking 100 may generate an optimal parking route by determining a size of and a distance to the set target parking space. Here, if the set target parking space is based on the parking space received from the control server 20, first, the apparatus for controlling autonomous parking 100 may perform autonomous driving so that the host vehicle moves to a corresponding position.

In this case, the apparatus for controlling autonomous parking 100 may determine the size of and the distance to the target parking space based on the previously detected surrounding situation of the host vehicle. In this way, the apparatus for controlling autonomous parking 100 may perform autonomous parking of the host vehicle 10 according to the generated optimal parking route.

Figure 6:
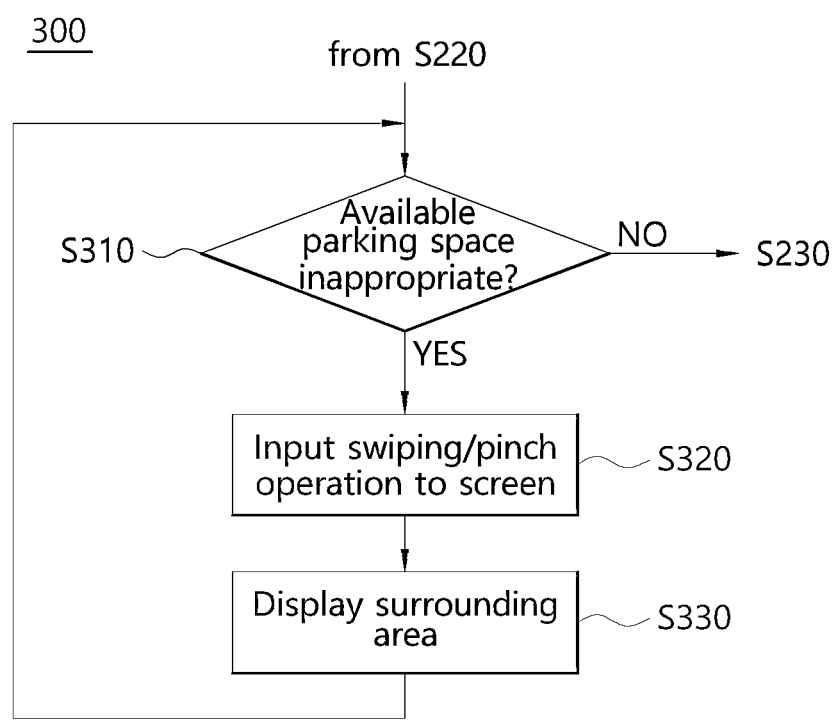
FIG. 6 is a flowchart showing a process of selecting other available parking space in the method for controlling autonomous parking according to an exemplary embodiment of the present disclosure.

FIG. 6 is a flowchart showing a process of selecting other available parking space in the method for controlling autonomous parking according to an exemplary embodiment of the present disclosure.

A method for controlling autonomous parking 300 includes inputting a swiping/pinching operation (S310 and S320) and displaying a surrounding area (S330).

More specifically, as shown in FIG. 6, first, it is checked whether an available parking space or an available parking space desired by a user does not exist on an area displayed on a screen S at step S310. In this case, if the user determines that an available parking space is appropriate, the apparatus for controlling autonomous parking 100 may proceed to step S230 to perform autonomous parking.

As a result of the determination at step S310, if the user selects that the available parking space is inappropriate, a swipe (or swiping) operation or a pinch operation is input to the screen S at step S320. In this case, if the user wants to move up, down, left, or right of the currently displayed area, the user may input the swipe operation. In addition, if the user wants to know a wider range of information, the user may input the pinch operation.

Next, the apparatus for controlling autonomous parking 100 display a surrounding area by changing the display area according to the user's swipe operation or pinch operation at step S330. In an example, when a user's swipe operation is input, the apparatus for controlling autonomous parking 100 may display an area moved in the swipe direction from the current position on the screen S. Here, the swipe direction may include any of up, down, left, or right direction.

In addition, the apparatus for controlling autonomous parking 100 may expand or reduce and display the display area on the screen S when a user's pinch operation is input. Here, the pinch operation may include an increase and decrease in distance between fingers. That is, when the distance between fingers increases, the display area may be expanded, and when the distance between fingers decreases, the display area may be reduced.

In this case, the apparatus for controlling autonomous parking 100 may be configured to display a display area that is moved, expanded, or reduced by using the available parking space information stored through previous search.

Next, when it is determined again whether the available parking space is inappropriate in the display area changed according to the user's swipe operation or pinch operation, and if it is inappropriate, the apparatus for controlling autonomous parking 100 may repeat steps S320 to S330.

With such a method, the method for controlling autonomous parking according to an embodiment of the present disclosure may improve the user's operability and convenience, improve the user's sense of stability and satisfaction for parking, further improve the user's operability and convenience by allowing the user to intuitively select with a minimum operation, and easily provide more information on the available parking spaces.

Such methods may be implemented by the apparatus for controlling autonomous parking 100 as shown in FIG. 1, and in particular, may be implemented as a software program that performs such steps, wherein such program may be stored on a computer-readable recording medium or transmitted by a computer data signal combined with a carrier wave in a transmission medium or a communication network. In this case, the computer-readable recording medium may include any kind of recording device in which data readable by a computer system is stored.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

What is claimed is:

1. An apparatus for controlling autonomous parking, comprising:
   a sensor to detect surrounding information of a host vehicle;
   a transceiver to communicate with a control server to receive space information in a parking lot;
   a display to display a parking situation; and
   a controller communicatively connected to the sensor, the transceiver, and the display and configured to:
   detect available parking spaces based on a detection result from the sensor and space information from the control server,
   control the display to display the available parking spaces including one or more available parking spaces detected by the sensor of the host vehicle and one or more available parking spaces detected the space information received from the control server which are displayed in a different way from each other at the same time the display, and
   perform autonomous parking by setting a position selected by a user's drag operation to a target parking space among the detected available parking spaces displayed on the display.

2. The apparatus of claim 1, further comprising:
   a storage to store information on the detected available parking spaces,
   wherein the controller is configured to store available parking spaces searched based on the detection result of the sensor in the storage.

3. The apparatus of claim 1, wherein the controller is configured to set a target parking space to a position to which the host vehicle icon is moved by the drag operation on the display.

4. The apparatus of claim 1,
   wherein when a user's swipe operation is input the controller is configured to display an area moved in the swipe direction from a current position on the display.

5. The apparatus of claim 1, wherein the controller is configured to expand or reduce and display a display area on the display when a user's pinch operation is input.

6. The apparatus of claim 1, wherein the controller is configured to receive parking lot map information from the control server and display the available parking spaces on the parking lot map.

7. The apparatus of claim 1, wherein the controller is configured to recognize surrounding obstacles and parking lines according to the detection result of the sensor and display them on the display.

8. The apparatus of claim 1, wherein the controller is configured to generate an optimal parking route by determining a size of and a distance to the set target parking space.

9. The apparatus of claim 8,
   wherein the controller is configured to perform autonomous driving so that the host vehicle moves to a corresponding position if the set target parking space is based on the space information received from the control server.

10. The apparatus of claim 1, wherein the display is a touch screen panel.

11. The apparatus of claim 1, wherein the sensor comprises at least one of an image sensor, a lidar sensor, a radar sensor or an ultrasonic sensor and the transceiver comprises a short-range wireless communication module or a long-range wireless communication module.

12. The apparatus of claim 1, wherein the sensor comprises a front camera or an around view camera and the controller is configured to display the surrounding information in an around view.

13. A method for controlling autonomous parking, comprising:
    detecting available parking spaces based on surrounding information detected by a sensor of a host vehicle and space information received from a control server;
    displaying the detected available parking spaces including one or more available parking spaces detected by the sensor of the host vehicle and one or more available parking spaces detected by the space information received from the control server which are displayed in a different way from each other at the same time on a display;
    receiving an input of drag operation by a user among the detected available parking spaces displayed on the display; and
    performing autonomous parking by setting a position selected by the drag operation to a target parking space.

14. The method of claim 13, wherein the detecting includes storing the available parking spaces searched based on the surrounding information detected by the sensor of the host vehicle.

15. The method of claim 13, wherein the performing includes setting a target parking space to a position to which the host vehicle icon is moved by the drag operation on the display.

16. The method of claim 13, wherein the displaying includes, when a user's swipe operation is input, displaying an area moved in the swipe direction from a current position on the display.

17. The method of claim 13, wherein the displaying includes expanding or reducing and displaying a display area on the display when a user's pinch operation is input.

18. The method of claim 13, wherein the displaying includes receiving parking lot map information from the control server and displaying the available parking spaces on the parking lot map.

19. The method of claim 13, wherein the displaying includes recognizing detected surrounding obstacles and parking lines and displaying them on the display.

20. The method of claim 13, wherein the displaying includes displaying the surrounding information detected by the sensor in an around view on the display.

21. The method of claim 13, wherein the performing includes generating an optimal parking route by determining a size of and a distance to the set target parking space.

22. The method of claim 21, wherein the performing includes performing autonomous driving so that the host vehicle moves to a corresponding position if the set target parking space is based on the space information received from the control server.

* * * * *